United States Patent [19]

Wallace et al.

[11] Patent Number: 4,852,290
[45] Date of Patent: Aug. 1, 1989

[54] FISHING ROD HOLDER

[75] Inventors: Terry A. Wallace, 107 Kathyrn La., Greenville, N.C. 27834; Lyvone Wallace, Greenville; Harry C. Hopkins, Williamston, both of N.C.

[73] Assignee: Terry A. Wallace, Greenville, N.C.

[21] Appl. No.: 79,219

[22] Filed: Jul. 29, 1987

[51] Int. Cl.$^4$ .............................................. A01K 97/12
[52] U.S. Cl. ......................................... 43/17; 43/21.2
[58] Field of Search ........................... 43/21.2, 16, 17; 248/538

[56] References Cited

U.S. PATENT DOCUMENTS

| D. 219,971 | 2/1971 | Bennett et al. | 43/21.2 |
|---|---|---|---|
| 1,987,842 | 1/1935 | Sampson | 248/538 |
| 2,473,778 | 6/1949 | Benes | 43/21.2 |
| 2,924,038 | 2/1960 | Dahlgren | 43/16 |
| 3,802,112 | 4/1974 | Banner | 43/21.2 |
| 4,161,839 | 7/1979 | Ward | 43/21.2 |
| 4,528,768 | 7/1985 | Anderson | 43/21.2 |
| 4,676,019 | 6/1987 | Engles | 43/21.2 |

FOREIGN PATENT DOCUMENTS 2222011 10/1974 France .............................. 43/21.2

Primary Examiner—Nicholas P. Godici
Assistant Examiner—Karen Skillman
Attorney, Agent, or Firm—Darby & Darby

[57] ABSTRACT

A fishing rod holder has two pivotally connected brackets. One braket has a hollow cylindrical opening to receive the rod and has a clamp for securing the holder to a stationary surface. A quick release lever allows the rod to be removed from the holder in time to hook a fish. Also, the angular position of the brackets with respect to each other can be set to meet desired fishing conditions.

8 Claims, 1 Drawing Sheet

FISHING ROD HOLDER

TECHNICAL FIELD

The present invention relates to fishing aids and, more particularly, to a device for holding a fishing rod.

BACKGROUND ART

Hand fishing by means of a fishing rod is a popular sport and relaxation. When fly casting is involved, the sportsman constantly uses the rod to cast about at various spots in the water seeking fish. No problem of holding the rod is created in this style of fishing.

When fishing is more a relaxation than a sport, the fisherman may sit on the shore or in a boat in one spot for hours and dangle his line in the water. When this is the method used, the fisherman may fall asleep and drop his rod in the water. Even if he is awake, if he is inattentive, a fish may take the bait and pull the rod from his hands.

In order to counter this, a fisherman may wedge his rod between convenient objects, i.e., boards on a dock, the branches of a tree, etc. This, however, provides him an unreliable means of holding the rod. For example, it may still fall out or it may be wedged so tightly that it cannot be retrieved in time to catch the fish. Thus it would be advantageous to have a fishing rod holder that securely holds the rod when the fisherman is relaxing, but which releases it rapidly when necessary in order to land a fish.

DISCLOSURE OF THE INVENTION

The present invention is directed to a fishing rod holder that can securely hold the rod in place at various angles and can release the rod quickly when manual operation of the rod is needed.

In an illustrative embodiment of the present invention the fishing rod holder includes a pair of pivotally connected bracket arms. A first one of the bracket arms has an open hollow cylinder at one end, in which the rod is secured by a quick release device. The second bracket is connected to the first at a pivot point on the first that is remote from the open cylindrical end of the first bracket. Clamp or screw means are provided on the second bracket to hold the fishing rod holder and the rod to a stationary object, for example a boat or dock.

The quick release device of the bracket arm, whether achieved by a screw or lever, enables quick release of the rod so that the enjoyment and skill of the user can be maximized in reeling in the fish.

Additionally, the bracket arms can be set at different angles with respect to each other as appropriate to the weight of fish desired, type of fishing being performed, the type of line and lure, and the flexibility of the rod used.

Some embodiments employ a bell or other auditory means to alert the user when a fish is pulling on the hook. This enables a user to relax and sleep if he desires, knowing that his pole is secure and that he will be awakened and able to quickly release the pole if he has a fish.

BRIEF DESCRIPTION OF THE DRAWINGS

The foregoing and other features of the present invention will be more readily apparent from the following detailed description and drawings of an illustrative embodiment of the invention in which.

DESCRIPTION OF PREFERRED EMBODIMENTS

Figure 1:
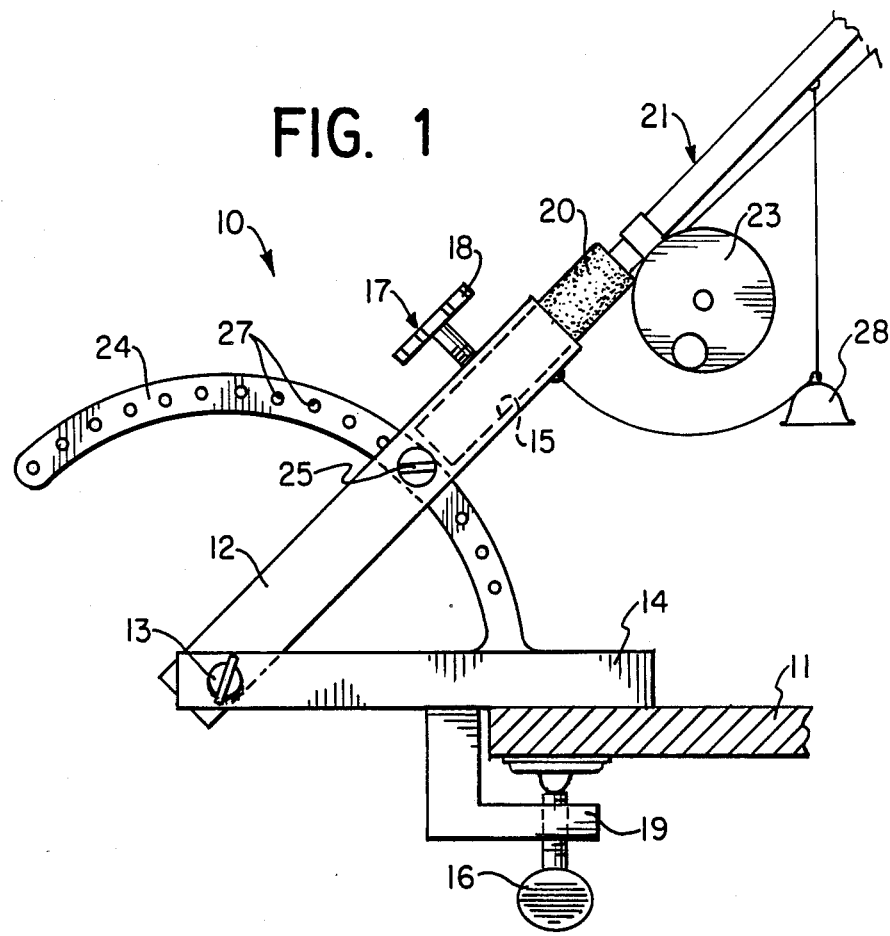
FIG. 1 is a side view of a fishing rod holder according to the present invention.

As shown in FIG. 1, the fishing rod holder 10 is basically constructed of two bracket arms 12, 14 that are pivotally connected to each other at pivot point 13. The arm 14 is equipped with a screw clamp 16 which extends from a C-shaped flange 19 and allows holder 10 to be secured to a stationary object 11, e.g. a portion of a boat or dock 11.

The holder 10 an be made of any convenient material, e.g. wood or metal. However, a plastics material is preferred.

The bracket arm 12 has a cylindrical opening 15 at the end remote from pivot point 13. This opening is large enough to receive the handle 20 (shown partly in dotted line) of a fishing rod 21 with a reel 23. In order to hold the rod in place in the cylindrical opening 15, a quick-release clamp 17 is provided along bracket 12. As shown in FIG. 1, the clamp 17 is a screw clamp with a large handle 18.

Figure 2:
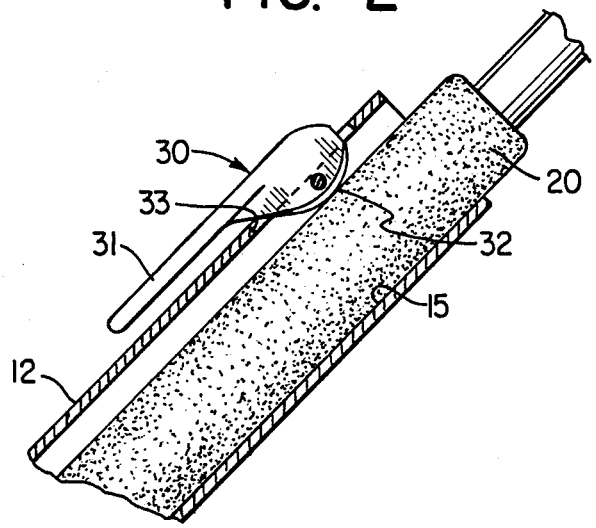
FIG. 2 is a sectional view of the holder with an alternative clamp for the rod.

An alternative quick-release clamp 30 is shown in FIG. 2. The clamp 30 is in the form of a lever 31 which is pivotally attached along bracket arm 12. A curved blade portion 32 of the clamp 30 extends through a slot 33 in the arm 12 and wedges the rod handle 20 in the cylinder. A portion of blade 32 that contacts the handle may be made of flexible high friction material, e.g. rubber, to accommodate rods of different diameter and to increase the wedging effect.

Either the clamp 17 or the lever mechanism 30 will lock or release a fishing rod located within the hollow cylinder 15. This gives the fishing rod user instant access to the rod when a fish has engaged the hook. This is particularly useful because, when a fish first encounters a hook it "mouths" the hook, i.e. puts its mouth around it without pulling the hook and causing it to sink into the fish's mouth. This is a crucial stage at which the fishing rod user must hand hook the fish by applying a sharp upward jerk to the rod, locking the hook into the fish's mouth. Without a quick release mechanism, it may take so much time to remove the fishing rod from the fishing holder, that the fish loses interest in the hook or simply eats the bait without getting hooked and swims away. Thus the present invention not only provides the user with a secure resting place for his rod while there are no fish, but also provides the ability to perform the often-needed "hooking" of the hook into the fish's mouth.

In the fishing art, many varieties of line are available. They differ in size, floatability and strength. Also, the angle of the rod with the respect to the horizontal may be varied to achieve different fishing techniques. For example, the user may wish to expose a lot of line on the water to give a fish lead line. In that case, the rod would be nearly horizontal. To achieve this, the bracket 12 would be 180 degrees with respect to bracket 14. This provides a floatable line angle.

With large fish that live deep in the water, a sinking line with the rod at a 45 degree setting may be more useful, since a heavy fish may hook itself and put considerable tension on the rod before the user is able to release the pole. The smaller angle settings with the right rod enable the rod to flex in response to a big fish swimming deep.

To allow the rod to be set at different convenient angles a slide 24 with a screw clamp 25 connects bracket arms 12 and 14. When the clamp 25 is released the arms can be set at any angle between zero degrees and 180 degrees (preferably 45 degrees to 180 degrees) as determined by angle markings on slide 24. When the desired angle is reached, clamp 25 is used to releasably lock the bracket arms at that angle. The setting of the brackets at an angle can be facilitated by providing holes 27 in the slide at selected angles, e.g. every 10°, and causing a protrusion on clamping screw 25 to extend into the proper hole when screwed into place.

Employing several holders simultaneously enables a user to attempt to secure more fish without the danger of loss of multiple unsecured rods to large fish before they can be reached. The user can now rest or has the option of performing other tasks while fishing with maximum enjoyment, security and catch potential.

Despite this the user can be alerted to the presence of a fish by a small bell 28 or similar device secured to the rod. When the rod flexes upon engagement of a fish with the hook, the bell rings and alerts the user to the presence of the fish.

While the invention has been particularly shown and described with reference to preferred embodiments thereof, it will be understood by those skilled in the art that various changes in form and details may be made therein without departing from the spirit and scope of the invention.

We claim:

1. A fishing rod holder comprising:
    a first bracket arm having an open hollow cylinder at one end and a pivot point at the other end;
    a second bracket arm connected at one end to the pivot point of said first bracket arm;
    clamping means for reducing at least a portion of the diameter of the cylinder to clamp a fishing rod in the cylinder, said clamping means bring adapted to enable quick release of the fishing rod from the fishing rod holder;
    means for mounting the second bracket arm to a stationary object; and
    means for adjustably locking the angular relation between the first and second bracket arms which comprises an adjusting bracket extending from said second bracket arm along the path of adjustment of a portion of said first bracket which is remote from the pivot point, said adjusting bracket and said first bracket arm defining locking means for locking the angular relationship between said first and second brake arms.

2. A fishing rod holder as in claim 1, wherein first and second bracket arms are adjustably secured at angles between 45 degrees and 180 degrees.

3. A fishing rod holder as in claim 1 further including a fishing rod in the cylinder and an alerting means for auditorily alerting the user to flexing of the rod, said alerting means being mounted on the rod beyond said first bracket arm.

4. A fishing rod holder as in claim 3 wherein said alerting means is a bell.

5. A fishing rod holder as in claim 1 wherein said clamping means comprises a threaded shaft that extends through the first bracket into the cylinder and into engagement with the rod so as to facilitate holding of the fishing rod within the cylinder and the quick release of the fishing rod from the cylinder.

6. A fishing rod according to claim 1, wherein said clamping means comprises a lever mechanism pivoted to the first bracket arm adjacent an aperture in the cylinder and a curved surface on the lever mechanism, which in one position of the level mechanism extends into the cylinder to facilitate holding of the fishing rod within the cylinder due to wedging of the rod between the cylinder walls and the curved surface, and which in another position of the lever mechanism is away from the fishing rod to permit the quick release of the fishing rod from the cylinder, said curved surface being made of a flexible material.

7. A fishing rod holder according to claim 1 wherein said adjusting bracket has an arc-shaped configuration and said locking means comprises a plurality of apertures defined along the length of said arc-shaped bracket at a predetermined angular position with respect to the pivot; and a retractable projection being extendable from the portion of said first bracket for engagement with a selected one of said apertures.

8. A fishing rod holder comprising:
    a first bracket arm having an open hollow cylinder at one end and a pivot point at the other end;
    a second bracket arm connected at one end to the pivot point of said first bracket arm;
    means for mounting the second bracket arm to a stationary object;
    means for adjustably securing the angular relation between the first and second bracket arms which comprises a curved bracket extending from said second bracket arm along the path of adjustment of a portion of said first bracket which is remote from the pivot point, said curved bracket and said first bracket arm defining securing means for securing the angular relationship between said first and second bracket arms; and
    clamping means for reducing at least a portion of the diameter of the cylinder to clamp a fishing rod in the cylinder, said clamping means being adapted to enable quick release of the fishing rod from the fishing rod holder and comprises a lever mechanism pivoted to the first bracket arm adjacent an aperture in the cylinder and a projecting surface on the lever mechanism, which in a first position of the level mechanism extends into the cylinder to facilitate holding of the fishing rod within the cylinder due to wedging of the rod between the cylinder walls and the curved surface, and which in a second position of the lever mechanism is away from the fishing rod to permit the quick release of the fishing rod from the cylinder, said projecting surface being resiliently held against the fishing rod when the lever mechanism is in said first position.

* * * * *